United States Patent
Fuse

(10) Patent No.: US 9,417,861 B2
(45) Date of Patent: Aug. 16, 2016

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hiroshi Fuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 13/834,527

(22) Filed: Mar. 15, 2013

(65) Prior Publication Data

US 2013/0263106 A1 Oct. 3, 2013

(30) Foreign Application Priority Data

Apr. 3, 2012 (JP) ................................ 2012-084972

(51) Int. Cl.
*G06F 9/44* (2006.01)
*G06F 9/445* (2006.01)

(52) U.S. Cl.
CPC ... *G06F 8/61* (2013.01); *G06F 8/65* (2013.01)

(58) Field of Classification Search
None
See application file for complete search history.

(56) References Cited

U.S. PATENT DOCUMENTS

| 6,742,180 | B1 * | 5/2004 | Ritz ............................... 717/174 |
| 8,132,047 | B2 * | 3/2012 | Bauer ................. G06F 11/1433 714/15 |
| 8,261,258 | B1 * | 9/2012 | Jianu et al. .................... 717/174 |
| 8,640,121 | B2 * | 1/2014 | Barr et al. ...................... 717/174 |
| 8,671,060 | B2 * | 3/2014 | Richardson ............. G06F 21/10 705/50 |
| 8,732,690 | B1 * | 5/2014 | Memmott ...................... 717/174 |
| 2003/0009752 | A1 * | 1/2003 | Gupta ............................ 717/171 |
| 2003/0221190 | A1 * | 11/2003 | Deshpande et al. ........... 717/171 |
| 2004/0003266 | A1 * | 1/2004 | Moshir ..................... G06F 8/65 713/191 |
| 2010/0257521 | A1 * | 10/2010 | Navarro ........................ 717/174 |
| 2011/0016414 | A1 * | 1/2011 | Ernst et al. .................... 715/764 |
| 2011/0307881 | A1 * | 12/2011 | Konersmann et al. ......... 717/171 |
| 2012/0323857 | A1 * | 12/2012 | Brehm ..................... G06F 8/61 707/674 |
| 2013/0227545 | A1 * | 8/2013 | Reierson et al. .............. 717/174 |
| 2013/0232479 | A1 * | 9/2013 | Jain et al. ...................... 717/174 |

FOREIGN PATENT DOCUMENTS

JP 2000-200184 A 7/2000

(Continued)

OTHER PUBLICATIONS

A partial English-language version of the Dec. 14, 2015 JP2012-084972 Japanese Office Action that indicates, for the "UTAU Starter Pack" NPL reference, degree of relevance found by the Japanese patent office.

(Continued)

*Primary Examiner* — Evral E Bodden
(74) *Attorney, Agent, or Firm* — Canon USA, Inc. IP Division

(57) ABSTRACT

An information processing apparatus includes a storage unit and a control unit. The storage unit stores a first installer to install an application formed of a plurality of software components and a second installer to install a correction module to change the software components constituting the application. The control unit performs control to install the application using the stored first installer if the application is not installed, and install the correction module using the stored second installer if the installation of the correction module changes the installed application.

16 Claims, 8 Drawing Sheets

(56) References Cited

FOREIGN PATENT DOCUMENTS

| | | |
|---|---|---|
| JP | 2001-236211 A | 8/2001 |
| JP | 2005-339070 A | 12/2005 |
| JP | 2009-110089 A | 5/2009 |

OTHER PUBLICATIONS

A partial English-language version of the Dec. 14, 2015 JP2012-084972 Japanese Office Action that indicates, for the "Master of Sonar 8" NPL reference,, degree of relevance found by the Japanese patent office.

* cited by examiner

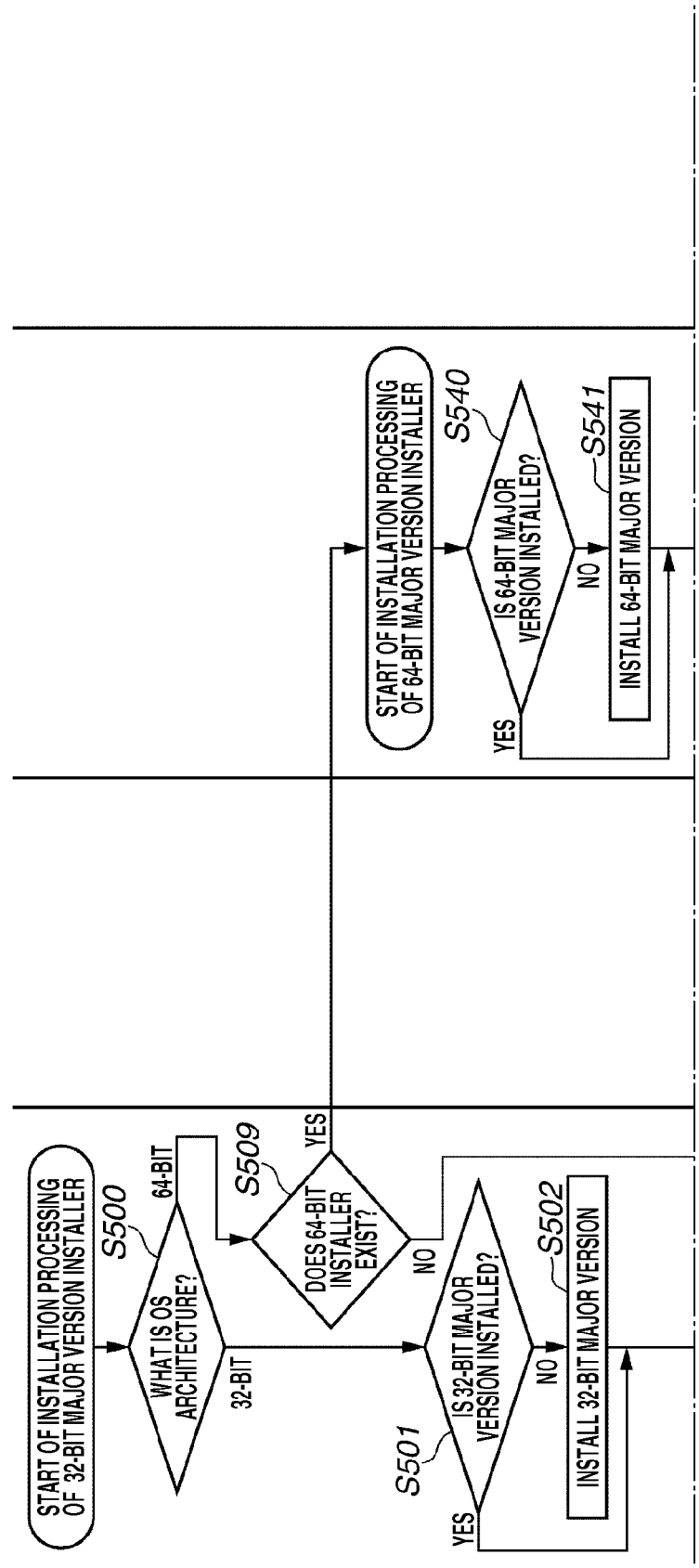

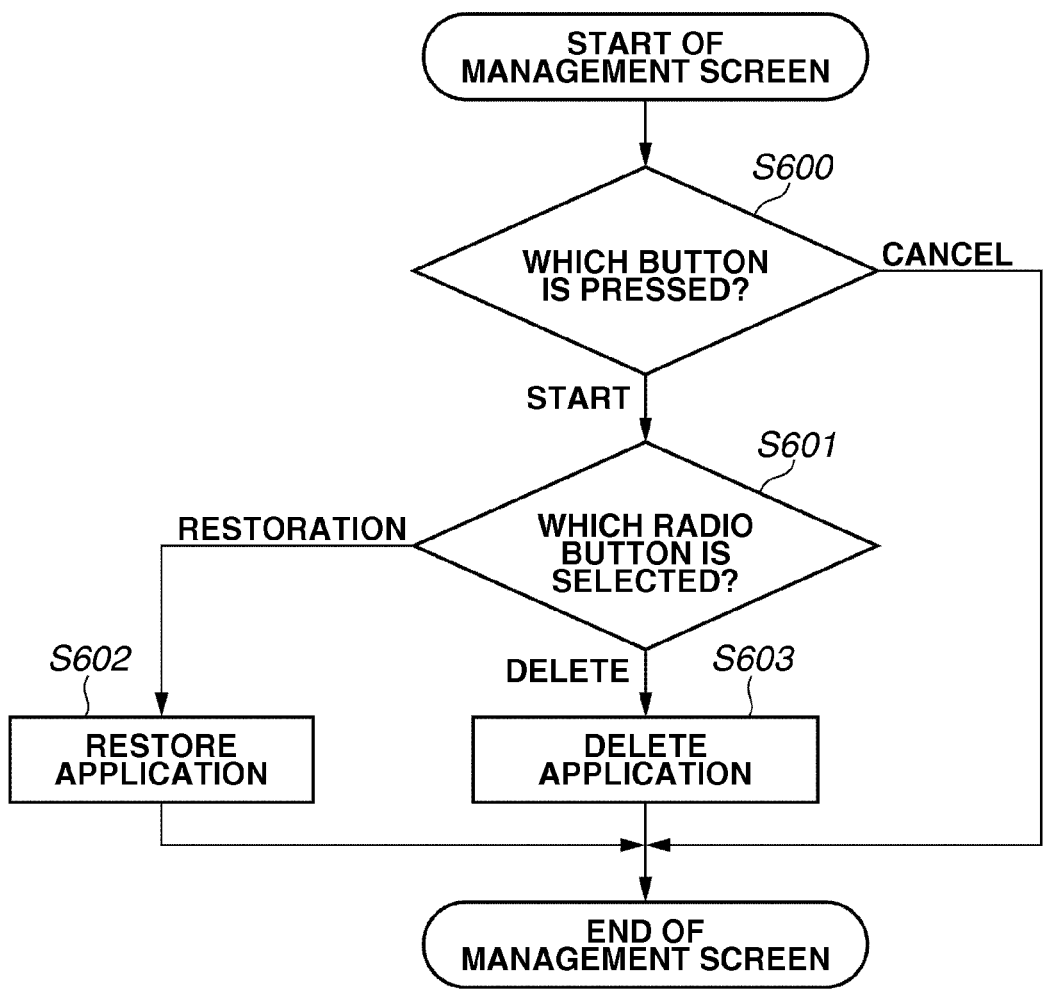

INFORMATION PROCESSING APPARATUS, METHOD FOR CONTROLLING THE SAME, AND STORAGE MEDIUM

BACKGROUND OF THE INVENTION

1. Field of the Invention

The present invention relates to an information processing apparatus which installs an application using an installer, a method for controlling the same, and a storage medium.

2. Description of the Related Art

As an application becomes sophisticated in function, a system environment required for using a software has also undergone a great change year by year (the system environment refers to a file, registry, service, setting status of an operating system (OS), and installation status of an application). This increases the number of modules of the software installed in the information processing apparatus. Furthermore, items to be changed corresponding to the system environment such as description in the registry required for operating the module and setting change in the security of the OS are too numerous to comprehensively list here.

As a result, the number of types of installers has been increased such as a service pack installer for upgrading the version of an application and 32-bit and 64-bit installers for each architecture of the OS. Increase in the number of the installers causes a user to select an installer corresponding to the desirable application to be installed. For example, if two types of installers such as a 32-bit major version and a 32-bit Service Pack are stored in an installation media, the user himself has to select the installer suited for the user's system environment.

In view of such a problem, a technique has been developed in which an automatic execution function of the OS executes the process of the installer without the user selecting the installer when the installation media is put into the information processing apparatus. There is software activating the major version installer by the automatic execution function if the installation media storing major-version and service-pack installers, for example, is put into the information processing apparatus.

A technique discussed in Japanese Patent Application Laid-Open No. 2001-236211 is concerning an automatic application installation. Japanese Patent Application Laid-Open No. 2001-236211 discusses the technique that a management apparatus for managing and extracting the version of the application to be installed in an information processing apparatus installs an application which can be installed in the information processing apparatus. The technique is one of the automatic execution functions.

SUMMARY OF THE INVENTION

According to an aspect of the present invention, an information processing apparatus includes a storage unit configured to store a first installer configured to install an application formed of a plurality of software components and a second installer configured to install a correction module to change the software components constituting the application, and a control unit configured to perform control to install the application using the stored first installer if the application is not installed, and install the correction module using the stored second installer if the installation of the correction module changes the installed application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5, including FIGS. 5A and 5B, illustrates a flow chart of the installation processing executed by installers.

FIG. 6 illustrates a flow chart for the management processing of the application by the installers.

DESCRIPTION OF THE EMBODIMENTS

Figure 1:
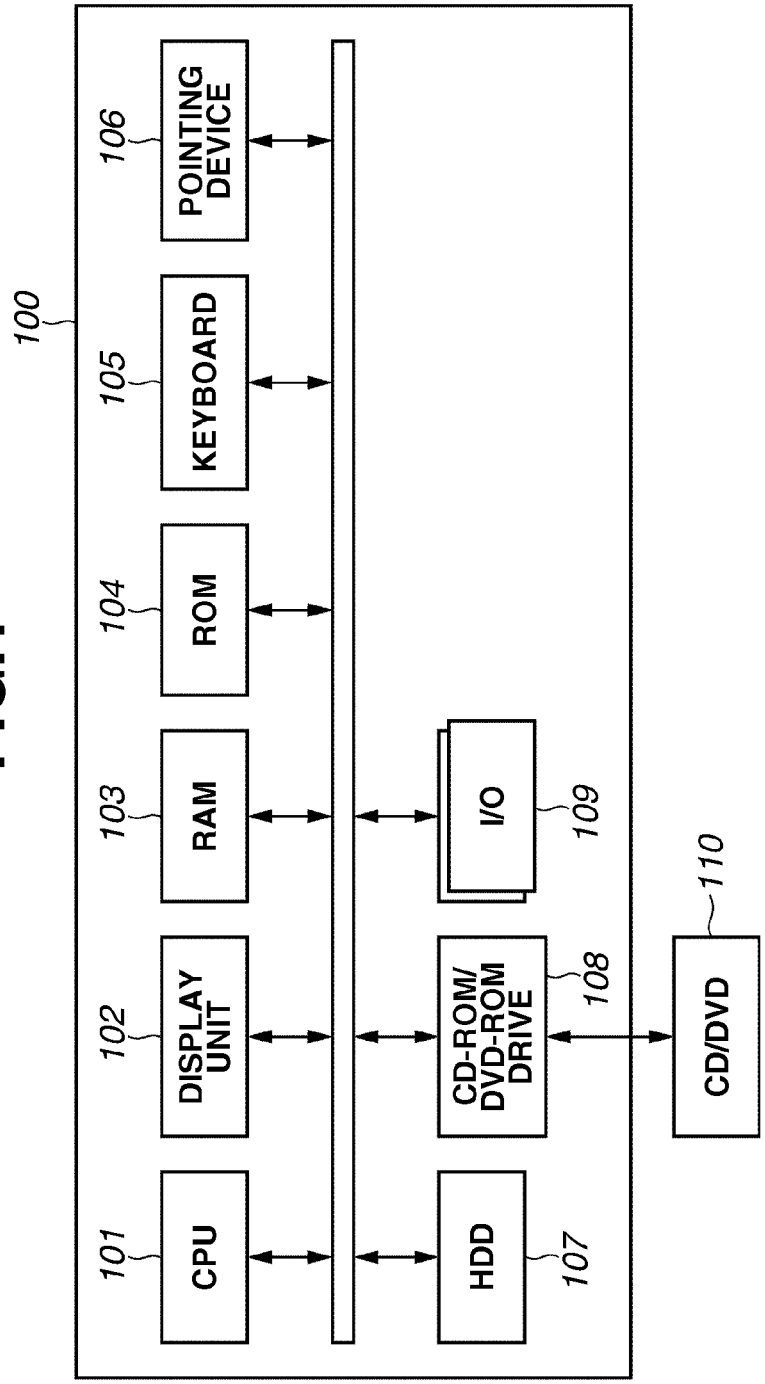
FIG. 1 illustrates a hardware configuration of an information processing apparatus.

Various exemplary embodiments, features, and aspects of the invention will be described in detail below with reference to the drawings.

A conventional automatic execution function does not have such an function as to install an application using an proper installer according to the system environment of the information processing apparatus executing the installer. For this reason, the conventional automatic execution function cannot always install the application using an installer suited to the system environment of the information processing apparatus.

The following describes in detail problems occurring in the information processing apparatus which installs an application using an installer, a method for controlling the same, and a program.

First, a problem is solved that occurs when the major version installer is activated by the automatic execution function to display a management screen for restoring or deleting an application when a user applies a service pack to the application installed in the information processing apparatus. The above problem is troublesome for the user because the user wanting to apply the service pack to the application needs issuing instructions for closing the management screen, selecting a service pack installer from an installation media, and activating the installer. The problem is that some logics required for activating the service pack installer from the major version installer do not exist in the conventional technique.

Secondly, a problem is solved that a proper installer cannot be activated due to a difference in architecture of the OS. One aspect of the problem is described below with Windows (registered trademark) as an example. When the automatic execution function activates the 32-bit installer in a 64-bit environment, an error indicating that a 64-bit installer needs to be used is sometimes displayed. If such an error is displayed, the user has to manually activate the 64-bit installer.

There is a Windows 32-bit on Windows 64-bit (WOW 64) installer that can operate the architecture of the OS in both 32 and 64 bits. The WOW 64 (or WOW64) installer is a subsystem of the OS capable of running 32-bit applications and is included in and associated with a 64-bit versions of the OS. However, the WOW 64 installer has not solved the following problem. The WOW 64 installer uses software for emulation because it is activated as a 32-bit process to perform emulation. Since the software for emulation is not used in 64 bits, the WOW 64 installer is inferior to the 64-bit installer in performance.

Further, the WOW 64 installer is not interchangeable very well with the 64-bit installer used in an installation process, which causes a problem that a 64-bit dynamic link library (DLL) cannot be loaded. Furthermore, the WOW 64 installer is more complicated than 32- and 64-bit installers in registry and folder operation, which increases the man-hour of a developer producing the installer. It is preferable from the above reason that the installer best suited for the architecture of the OS should be activated rather than the installer for performing emulation, however, user operation is troublesome in this case.

The above describes the problems of the present invention. At least one of the problems can be solved by the information processing apparatus provided by the present invention.

Terms used for describing the present invention are described below.

The 64-bit environment is an architecture in which the 64-bit environment is larger than the 32-bit environment in the amount of data which can be loaded to a memory in one processing and the amount of one-clock processing. The 64-bit environment is faster than the 32-bit environment in a data processing speed. In other words, the 64- and the 32-bit environment are architectures different in data processing logic. The 64-bit environment corresponds to a first architecture and the 32-bit environment corresponds to a second architecture.

An application is a software program which provides a user who wants to obtain a desired result with a user interface for instructing the start of a specific processing and executes the specific processing based on setting input via a user interface. The application is composed of components and each component is given a role for providing the user interface or executing a specific processing. The component is a software component for achieving the role.

Each component is an aggregate of the software components called a module. In general, the application often causes bugs in units of modules. A service pack is distributed which includes module groups for getting rid of the bug. The component and the module are different in scale from each other but common in that both are components constituting the application, so that both are referred to as a software component in the present invention. The software component refers to software constituting the application.

The application is executed on the OS and can be executed by installation into the OS. The application is software which depends on the OS and needs to have a software configuration suited to each system environment in consideration of a difference between the OSes and between architectures even if the OS is the same. If an application without a software configuration suited to the system environment is installed in the information processing apparatus, the application cannot fully exert its original function and may affect the operation of the information processing apparatus as the case may be.

The installer is auxiliary software for installing an application in the information processing apparatus equipped with the OS or uninstalling the application as well as restoring the installed application. The installer allows the user to easily install the application. The installer shall be prepared for each of a plurality of applications with software configuration suited to each system environment. Each installer realizes an optimal installation processing to cause the application to fully exert its function.

An exemplary embodiment of the present invention is described below with reference to the accompanying drawings.

FIG. 1 illustrates a hardware configuration of a system environment applied in a first exemplary embodiment of the present invention and, more specifically, a hardware configuration of an information processing apparatus 100. In FIG. 1, the information processing apparatus 100 is a computer used by the user. A predetermined operating system (OS) is installed in the information processing apparatus 100 and various types of applications for executing a specific function are also installed therein.

The information processing apparatus 100 includes a keyboard 105 and a pointing device 106 which are input devices for receiving an operational input from the user. The information processing apparatus 100 further includes a display unit 102 which provides the user with a visual output information feedback.

There are further provided a random access memory (RAM) 103, a read only memory (ROM) 104, and a hard disk drive (HDD) 107 which are storage devices for storing various programs and execution information in the present exemplary embodiment. There is still further provided a compact disk (CD)-ROM/digital versatile disk (DVD)-ROM drive 108 for reading data recorded in a CD/DVD 110.

A central processing unit (CPU) 101 loads the OS and other control programs including control programs for realizing the present invention into the RAM 103 and executes them. The RAM 103 functions as various working areas used for executing the control programs and a temporary save area. The ROM 104 stores various control programs by which the CPU 101 performs various controls. The information processing apparatus 100 further includes an interface device I/O 109 for communicating with an external apparatus and the CPU 101 for executing programs. The information processing apparatus 100 may be connected with peripherals by wire or wirelessly.

Figure 2:
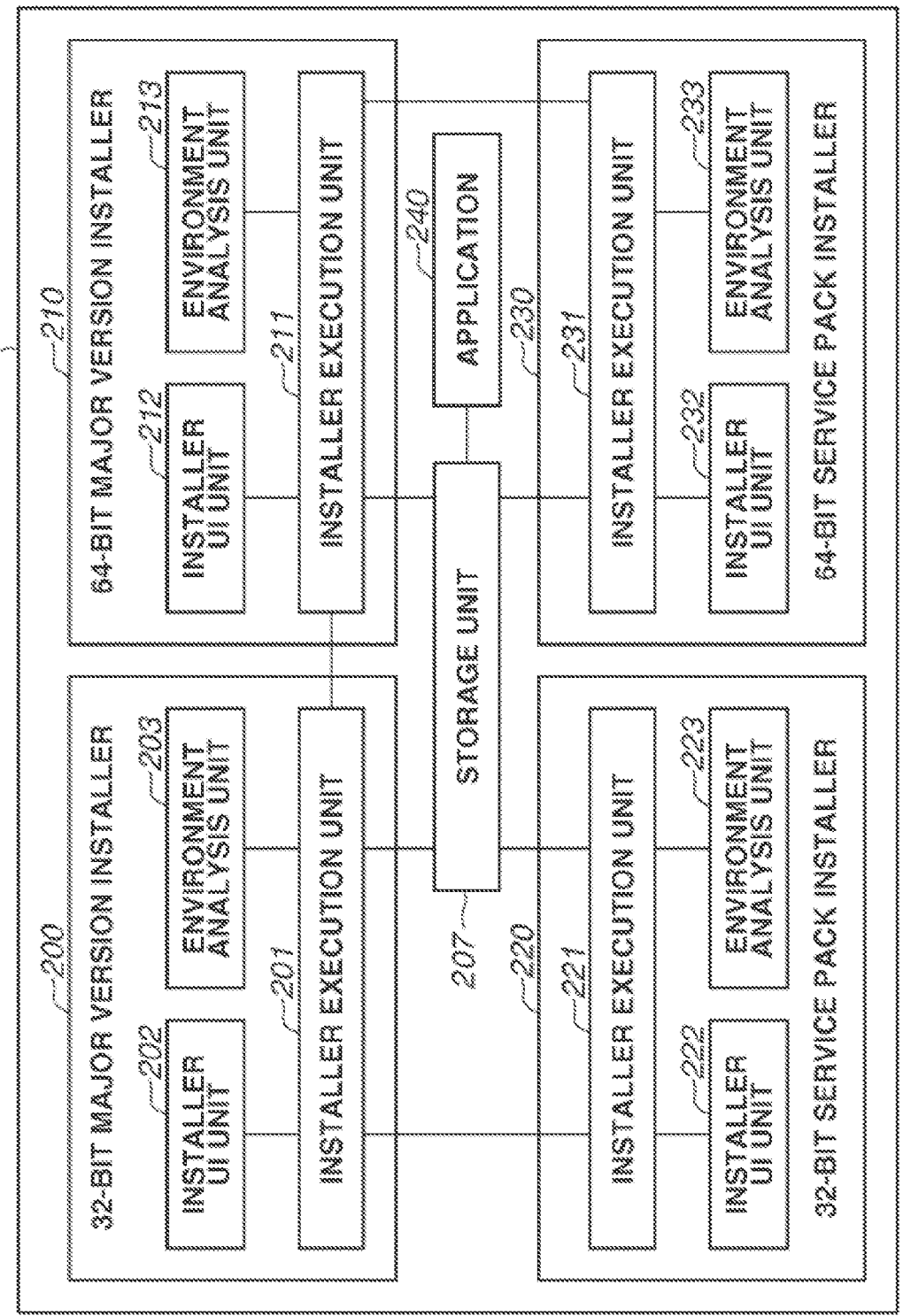
FIG. 2 is a block diagram illustrating the configuration of software.

FIG. 2 is a block diagram illustrating an example of software configuration of the information processing apparatus 100.

A 32-bit major version installer 200 provides a user interface required for the installation of applications. The 32-bit major version installer 200 performs processing required for the installation of applications according to a user's request received via the provided user interface. The 32-bit major version installer 200 is realized by the CPU 101 executing programs stored in a storage unit 207 represented by the HDD 107 or in the CD/DVD 110. Each installer is stored in the RAM 103 and then executed by the CPU 101. Execution information and temporary data are stored in the RAM 103. In other words, the CPU 101 realizing the software configuration illustrated in FIG. 2 performs control to execute the processing provided by the various software.

A 64-bit major version installer 210, a 32-bit service pack installer 220, and a 64-bit service pack installer 230 perform the same function as the 32-bit major version installer 200. The storage unit 207 or the CD/DVD 110 stores four installers, namely the 64-bit major version installer 210, the 32-bit service pack installer 220, the 64-bit service pack installer 230 and the 32-bit major version installer 200. The 32-bit major version installer 200 corresponds to a first installer. The 32-bit service pack installer 220 corresponds to a second installer. The 64-bit major version installer 210 corresponds to a third installer or the second installer. The 64-bit service pack installer 230 corresponds to a fourth installer.

Only the 32-bit major version installer 200 has a log output function for outputting log data regarding the installation processing while the other installers have a different log output function. As described in detail below, the log data output by the 32-bit major version installer 200 and the other installers are different from each other. Each installer is realized in the same manner as the 32-bit major version installer 200.

Since each installer is prepared for each different system environment, components and/or modules installed by each installer are different in each installer. For example, the 32-bit major version installer 200 can install a new application or a version in which specifications of a system or a program are substantially modified. The 32-bit service pack installer 220 can perform an upgrade installation by applying a minor modification module to a major version application.

In other words, the major version installer is an application for providing a new effect for the user and an installer for installing a major version application with a component for executing a specific processing. On the other hand, the service pack installer is an installer for applying a module for adding and modifying a module constituting a component for executing the specific processing, to the component of the installed application. The service pack installer is an installer for providing a modification module for changing a module constituting the installed application.

Each installer for 64 bits is an installer for installing a major version application and a modification program adapted to the 64-bit environment in the information processing apparatus 100.

Components 201 to 203 constitute the 32-bit major version installer 200. An installer execution unit 201 in the 32-bit major version installer 200 has functions of installation, uninstallation, restoration installation, output of log data, and construction of an application setting, for a 32-bit application. The installer execution unit 201 activates a different installer based on information analyzed by an environment analysis unit 203. Then, the installer activated on another process ongoingly performs the installation processing.

An installer user-interface (UI) unit 202 constructs a user interface for installing a 32-bit major version application and receives various input operations from the user.

The environment analysis unit 203 acquires and analyses the environment information of the information processing apparatus 100. The environment information refers to the architecture information of the OS, the version information of the OS, registry information, an environment variable, the installed software information, the various settings of the application, for example. All pieces of information are not always treated as the environment information.

Each installer performs determination processing described below via the environment analysis unit 203. The environment analysis unit 203 acquires the environment information and transmits analysis results to the installer. However, the environment analysis unit 203 may transmit the acquired environment information as it is. In the present exemplary embodiment, an expression that the acquired environment information is transmitted includes both configurations.

Components 211 to 213 constitute the 64-bit major version installer 210. The components 211 to 213 correspond to a 64-bit environment of the 32-bit components 201 to 203. The installer execution unit 211 corresponds to the installer execution unit 201. An installer UI unit 212 corresponds to the installer UI unit 202. An environment analysis unit 213 corresponds to the environment analysis unit 203. Components 221 to 223 constitute the 32-bit service pack installer 220.

An installer execution unit 221 in the 32-bit service pack installer 220 has functions of installation of an application, output of log data, and construction of an application setting. The installer execution unit 221 changes the installation processing based on information analyzed by an environment analysis unit 223.

An installer UI unit 222 in the 32-bit service pack installer 220 constructs a user interface and receives various input operations from the user.

An environment analysis unit 223 in the 32-bit service pack installer 220 has a function to analyze the environment information of the information processing apparatus 100.

Components 231 to 233 constitute the 64-bit service pack installer 230. The components 231 to 233 correspond to a 64-bit environment of the 32-bit components 221 to 223. The installer execution unit 231 corresponds to the installer execution unit 221. An installer UI unit 232 corresponds to the installer UI unit 222. An environment analysis unit 233 corresponds to the environment analysis unit 223.

An application 240 is a software program equivalent to the above application.

Figure 3:
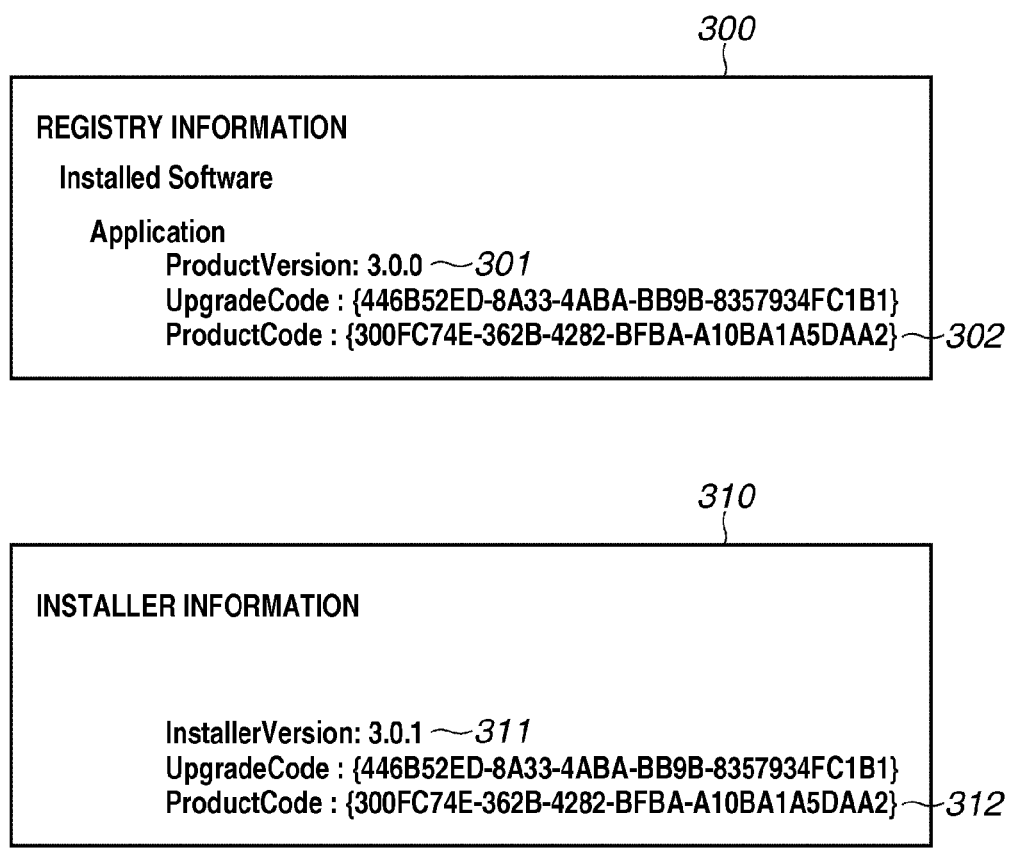
FIG. 3 illustrates examples of registry information and installer information.

FIG. 3 illustrates examples of registry information 300 of the information processing apparatus 100 and installer information 310 of the installers 200, 210, 220 and 230. The registry information 300 lists the registry information of the information processing apparatus 100 and stores the information of the application 240 installed in the information processing apparatus 100. The registry information 300 stores version information 301, a ProductCode 302, an UpgradeCode, a Global Unique Identifier (GUID), and an installation path, for example.

The version information 301 indicates a version of the application 240 installed in the information processing apparatus 100. For example, if the value of the version information 301 is "3.0.0," the application 240 with a major version of "3," a minor version of "0," and a revision (the version of the applied service pack) of "0" is installed. If the revision is "0," it can be determined that the service pack is not installed.

The ProductCode 302 is a code unique to the application 240. If the ProductCode 302 of the application 240 exists in the registry information 300, the application 240 is installed.

The installer information 310 stores information required for the installation processing of the installers 200, 210, 220, and 230. The installer information 310 is the one stored in a setting file or the installers. The installer information 310 stores version information 311, a ProductCode 312, the UpgradeCode, the GUID of the installers 200, 210, 220, and 230.

The version information 311 indicates the version of an application which can be installed by the installer. For example, if the value of the version information 311 is "3.0.1," an installer that corresponds to the application 240 with a major version of "3," a minor version of "0," and a revision (the version of the service pack) of "1." is installed. If the revision is "1," it can be determined that the version "1" of the service pack is installed.

The ProductCode 312 is a code unique to the application 240. The installers write the ProductCode 312 in the ProductCode 302 of the registry information 300. In general, if the major and minor versions are the same, the ProductCode 302 uses the same code. In other words, if the service pack is installed, the value of the ProductCode 302 written in the registry information 300 is not changed.

In the example of FIG. 3, the application with the version 3.0 of the major version is installed in the information processing apparatus 100 with the registry information 300 and the installer with the version information 311 is a service pack. The registry information 300 and the installer information 310 are used at the time of the installation processing executed by the installers 200 and 220. A descriptive expression of the registry information 300 and the installer information 310 is not limited to the above. Described information is not limited to the above either.

Figure 4:
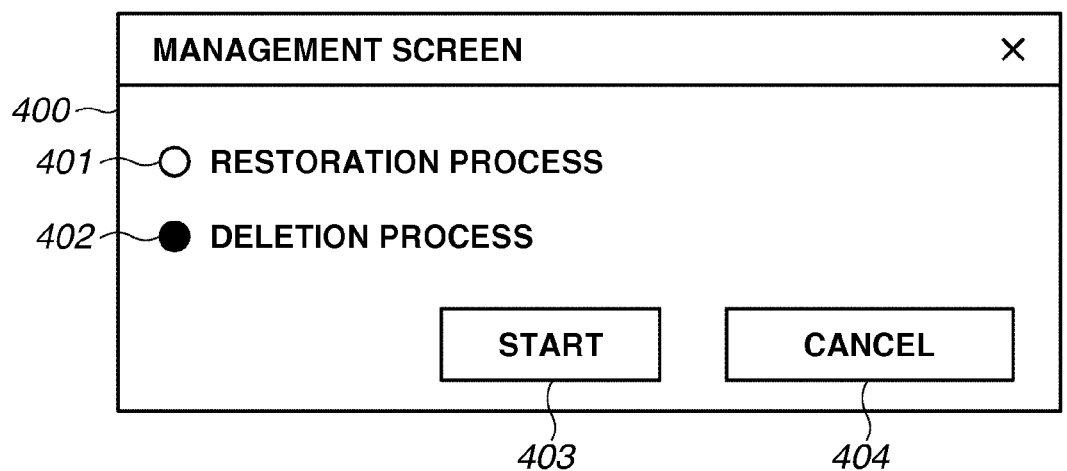
FIG. 4 illustrates a user interface (UI) for an installer management screen.

FIG. 4 illustrates a user interface for an installer management screen for operating the application.

The screen in FIG. 4 is displayed in the specifications of the installer for the OS of the information processing apparatus 100. The screen in FIG. 4 is the installer management screen displayed by a conventional installer or the 32-bit and 64-bit major version installers 200 and 210 in the first exemplary embodiment. In the environment in which applications has been installed, it is displayed when the installer for installing the applications are activated.

In general, if a service pack is applied to an installed application, an installer for the service pack needs to be activated. However, when the installer for the service pack is activated by the automatic execution function of the OS, the management screen is activated as illustrated in FIG. 4, so that the user needs to manually issue instructions for closing the screen and activate the installer for the service pack. The reason that such a procedure is needed is, when a media is inserted into the information processing apparatus 100, the automatic execution function of the OS can activate only one of the software programs included in the media.

In the first exemplary embodiment, if the application 240 which can be installed by the 32-bit major version installer 200 or the 64-bit major version installer 210 is already installed in the information processing apparatus 100, the screen illustrated in FIG. 4 is displayed by activating the installer corresponding to a major version application.

An installer management screen window 400 indicates a user interface of the installer UI unit 202. A restoration process radio button 401 represents a radio button to be selected at the time of restoring the application 240 installed in the information processing apparatus 100. For example, if the management screen is displayed by the 32-bit major version installer 200 and restoration is selected, the application is installed by the 32-bit major version installer 200. In other words, the management screen is used for re-installation if an operation of the major version application is not particularly good. A deletion process radio button 402 represents a radio button to be selected at the time of deleting (un-installing) the application 240 installed in the information processing apparatus 100.

A press on a start button 403 starts the processing selected by any one of the restoration process radio button 401 or the deletion process radio button 402. After the processing is ended, the installer management screen window 400 is closed. A press on a cancel button 404 closes the installer management screen window 400.

Figure 5B:
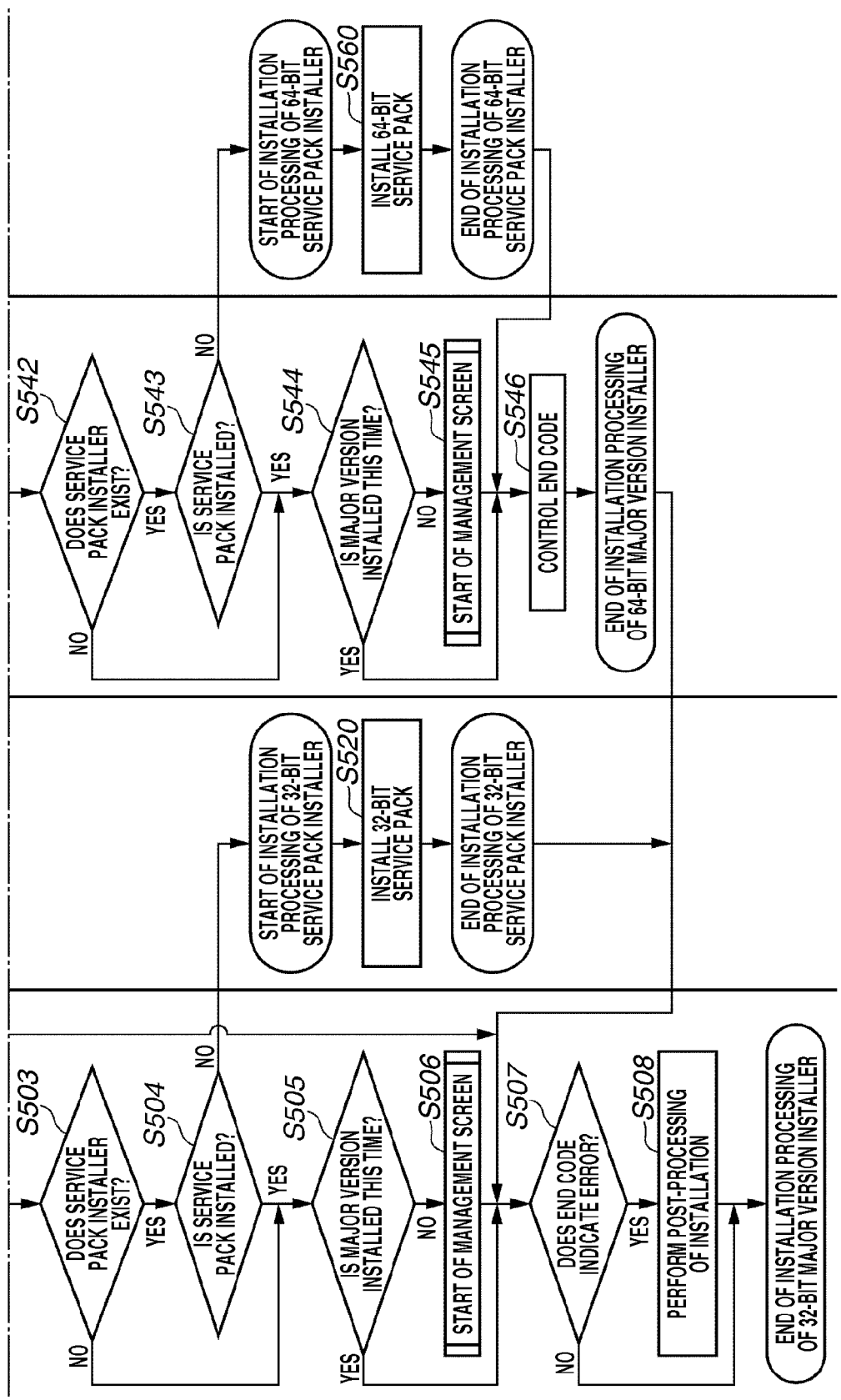

FIG. 5 illustrates a flow chart of the installation processing executed by the 32-bit major version installer 200, the 64-bit major version installer 210, the 32-bit service pack installer 220, or the 64-bit service pack installer 230. The flow chart is started when the installer execution unit 201 receives an operation indicating the execution of the 32-bit service pack installer 220, or the 32-bit service pack installer 220 is activated by the automatic execution function of the OS. When a user applies a service pack to an application installed in the information processing apparatus, the major version installer is activated by the automatic execution function to display a management screen for restoring or deleting an application since, for example, when a media is inserted into a computer, the automatic execution function of the OS can activate only one of the software programs included in the media. In other words, when the installer for the service pack is activated by the automatic execution function of the OS, the management screen is to be displayed as illustrated in FIG. 4. The term "activating" refers to start of the installation processing by the installer. The program of the installer is loaded to the RAM 103 simultaneously with the activating to execute the installation processing. In a case where another installer is activated by an installer performing the automatic execution function of the OS provided in the information processing apparatus, in the first exemplary embodiment, installation is performed without inquiring the user about installation using another installer.

In the first exemplary embodiment, 32-bit major version, 32-bit service pack, 64-bit major version, and 64-bit service pack installers are stored in one media (storage media such as a CD-ROM and a DVD-ROM, for example). However, as long as the installers are arranged in predetermined folders, processing is not limited to the processing executed from the media. In any case, the installers 200, 210, 220, and 230 are once stored in the RAM 103 and executed by the CPU 101. The installers 200, 210, 220, and 230 generate log data simultaneously when the installers are activated and output the log data for grasping a phenomenon occurring until the installers end, in parallel with the installation processing. The output processing of the log data is described below.

Solid lines in FIG. 5 indicate that the subjects of the processing are different. Specifically, the processing executed by the 32-bit major version, 32-bit service pack, 64-bit major version, and 64-bit service pack installers are illustrated from left to right, respectively.

In step 500, the installer execution unit 201 determines whether 32 or 64 bits architecture forms the OS of the information processing apparatus 100, via the environment analysis unit 203. The environment analysis unit 203 uses an application program interface (API) provided by the OS to acquire information about the architecture. The installer execution unit 201 determines whether 32 or 64 bits architecture forms the OS, based on the a acquired information.

The environment analysis unit 203 may refer to the environment variable of the OS, so that there is no limitation as to the acquisition of information about the architecture. The installer execution unit 201 acquires information about the architecture forming the OS by any methods. If the OS is formed of a 32-bit environment, the processing proceeds to step S501. If the OS is formed of a 64-bit environment, the processing proceeds to step S509.

In step 501, the installer execution unit 201 acquires the registry information via the environment analysis unit 203. The installer execution unit 201 determines whether the application with the major version corresponding to the activated installer is already installed in the information processing apparatus 100 based on the registry information 300 and the installer information 310.

A determination logic is described in detail below. The installer execution unit 201 analyzes whether the Product-Code 312 stored in the installer information 310 is stored in the registry information 300. If the code coinciding with the ProductCode 312 is included in the ProductCode 302 of the registry information 300 (YES in step S501), the installer execution unit 201 determines that the major-version application is installed. If the code coinciding with the Product-Code 312 is not included in the ProductCode 302 of the registry information 300 (NO in step S501), the installer execution unit 201 determines that the major-version application is not installed and processing proceeds to step S502.

If the installer execution unit 201 determines that the major-version application is installed, the installer execution unit 201 determines whether the major version of the version information 301 of a Product Version coincides with the version information 311 of an Installer Version. This is because, if the version information 301 is "3.0.0" and the version information 311 is "4.0.1," for example, the latest component of the application stored in a media needs to be installed.

If the installer execution unit 201 determines that the major version of the version information 301 coincides with the version information 311, the latest application is already stored, so that the processing proceeds to step S503. If the installer execution unit 201 determines that the major version of the version information 301 does not coincide, the latest application is already stored but the latest function cannot be used, so that the processing proceeds to step S502. In step S502, the installer execution unit 201 installs the 32-bit major version application. The execution of this step brings the application 240 into the 32-bit major version application.

In step S503, the installer execution unit 201 determines whether the 32-bit service pack installer 220 exists. If the 32-bit service pack installer 220 exists in a predetermined position (YES in step S503), the processing proceeds to step S504. The term "existence in the predetermined position" refers to, for example, a state where the 32-bit service pack installer 220 exists in the installation media and the installer is loaded to the RAM 103 or a state where the contents of the installation media are copied to the folder of the OS and the installer in the folder is loaded. If the 32-bit service pack installer 220 does not exist in the predetermined position (NO in step S503), the processing proceeds to step S505.

In step S504, the installer execution unit 201 determines whether the application corresponding to the service pack is already installed, via the environment analysis unit 203. In other words, the installer execution unit 201 installs a correction module to determine whether a change occurs in the version of the installed application 240. The determination logic is formed of the following two steps.

The installer execution unit 201 determines whether the ProductCode 312 of the installer information 310 stored in the 32-bit service pack installer 220 exists in the ProductCode 302 of the registry information 300. The installer execution unit 201 compares the value of the version information 301 stored in the registry information 300 with the version information 311 of the installer information 310 stored in the 32-bit service pack installer 220. For example, if the ProductCode 312 stored in the 32-bit service pack installer 220 exists in the ProductCode 302 of the registry information 300, the installer execution unit 201 determines that at least the major-version application is installed.

If the version information 301 is "3.0.0" and the version information 311 is "3.0.1," the revision of the version information 301 is greater than the version information 311, so that the installer execution unit 201 determines that the service pack is not installed. The revision of the version information 301 may be smaller than the version information 311. Even in that case, the installer execution unit 201 determines that the service pack is not installed.

Whether the module for changing the configuration of the application is applied to the application 240 may not necessarily be determined based on the version information. For example, if information indicating whether the service pack is installed is described in the registry information 300, whether the service pack is installed can be determined without comparing the version information. Even in this determination logic, as a result, the version of the application 240 changes as compared with the version to which the service pack installer has not yet applied the modification module.

If the ProductCode 312 of the installer information 310 exists in the registry information 300 and the version information 301 coincides with the version information 311, the installer execution unit 201 determines that the application corresponding to the service pack is already installed and the processing proceeds to step S503. If the ProductCode 312 of the installer information 310 exists in the registry information 300 and the version information 301 is not the same as the version information 311, the installer execution unit 201 determines that the application corresponding to the service pack is not yet installed and performs control so as to activate the 32-bit service pack installer 220. At this point, the 32-bit major version installer 200 temporarily stops the installation processing until the installation processing of the 32-bit service pack installer 220 is ended.

When the activated installation processing is ended, the processing of the 32-bit major version installer 200 is resumed. Thus, when not only the 32-bit major version installer 200 but the installer who is performing the installation processing activates other installers, the installers are activated by different processes. A invoking installer temporarily stops the installation processing. When the invoking installer acquires an ending code indicating the end of the installation processing from the activated installer, the invoking installer resumes the installation processing.

In step S505, along with the activation of the 32-bit installer at this time, the installer execution unit 201 determines whether the installation processing of the application 240 has been performed in step S502. If the installation processing has been performed in step S502 (YES in step S505), the installer execution unit 201 determines that the installation processing of the application 240 has been performed and the processing proceeds to step S507. If the installation processing has not been performed in step S502 (NO in step S505), the installer execution unit 201 determines that the installation processing of the application 240 has not been performed and the processing proceeds to step S506.

In step S506, the installer execution unit 201 activates the installer management screen for restoring or deleting the application 240. In step S507, the installer execution unit 201 determines whether the end code of the installation processing indicates an error. If the end code of the installation processing indicates an error (YES in step S507), the processing proceeds to step S508. If the end code of the installation processing does not indicate an error (NO in step S507), the installer execution unit 201 ends the installation processing of the 32-bit major version installer 200 and the processing of the flow chart is ended.

The end code can be received from the 32-bit major version installer 200, the 64-bit major version installer 210, and the 32-bit service pack installer 220 and the installer execution unit 201 makes determination in step S507 based on the received end code. In the first exemplary embodiment, since the end code of the 64-bit service pack installer 220 is collected by the 64-bit major version installer 210, the error code is not received from the 64-bit service pack installer 220. The error code of the 32-bit major version installer 200 is the one issued by the installer execution unit 201 itself.

In step S508, the installer execution unit 201 performs the post-processing of installation based on the end code. In the post-processing of installation, a message window is displayed to indicate the general description of an error and urge the re-activation of the OS. In other words, even if an error is caused by each installer, the post-processing of installation is performed by the 32-bit major version installer 200 that is a invoking installer.

In the flow chart, only the 32-bit major version installer 200 displays the message window. However, all the installers have a means for displaying the message window in consideration of a case where one of the other installers is singly activated. The reason each installer does not display the message window but only the 32-bit major version installer 200 displays the message window as a proxy in the first exemplary embodiment is described in detail below. A simple reason is that the 32-bit major version installer 200 performs log output processing including log data of each installer.

In step S509, the installer execution unit 201 determines whether the 64-bit major version installer 210 exists. If the 64-bit major version installer 210 exists (YES in step S509), the 64-bit major version installer 210 is activated. The detailed description of this determination processing is omitted because merely the 32-bit service pack installer 220 is replaced with the 64-bit major version installer 210 in the determination processing in step S503.

At the time, the 32-bit major version installer 200 temporarily stops the installation processing until the 64-bit major version installer 210 ends the installation processing. When the 64-bit major version installer 210 ends the installation processing, the 32-bit major version installer 200 resumes the installation processing.

If the 64-bit major version installer 210 does not exist (NO in step S509), the processing proceeds to step S507. The 64-bit major version installer 210 starts the installation processing by the installer execution unit 201 receiving the processing which indicates the execution of the 64-bit major version installer 210, from the installer execution unit 201 of the 32-bit major version installer 200.

In step S540, the installer execution unit 201 determines whether the 64-bit major version installer 210 installs the major version application via the environment analysis unit 213 based on the registry information 300 and the installer information 310. The determination is logically the same as a determination as to whether the 32-bit major version application is already installed in step S501. Specifically, the determination is made by replacing the 32-bit major version application with the 64-bit major version application. The detailed description of step S540 is omitted for the above reason.

If the installer execution unit 201 determines that the major version application is already installed (YES in step S540), the processing proceeds to step S542. If the installer execution unit 201 determines that the major version application is not yet installed (NO in step S540), the processing proceeds to step S541.

In step S541, the installer execution unit 211 installs the 64-bit major version application of the application 240. The execution of this step makes the application 240 the 64-bit major version application.

In step S542, the installer execution unit 211 determines whether the 64-bit service pack installer 230 exists. The determination is logically the same as a determination as to whether the 32-bit service pack installer exists in step S503. Specifically, the determination is made the 32-bit service pack installer with the 64-bit service pack installer. The detailed description of step S542 is omitted for the above reason.

If the installer execution unit 211 determines that the 64-bit service pack installer 230 exists (YES in step S542), the processing proceeds to step S543. If the installer execution unit 211 determines that the 64-bit service pack installer 230 does not exist (NO in step S542), the processing proceeds to step S544.

In step S543, the installer execution unit 211 determines whether the application corresponding to the service pack is already installed via the environment analysis unit 213 based on the registry information 300 and the installer information 310. The determination is logically the same as a determination as to whether the application corresponding to the 32-bit service pack is already installed in step S504. Specifically, the determination is made by replacing the 32-bit service pack application with the 64-bit service pack application. The detailed description of step S543 is omitted for the above reason.

If the installer execution unit 211 determines that the application corresponding to the service pack is already installed (YES in step S543), the processing proceeds to step S544. If the installer execution unit 211 determines that the application corresponding to the service pack is not yet installed (NO in step S543), the installer execution unit 211 performs control so as to activate the 64-bit service pack installer 230.

At the time, the 64-bit major version installer 210 temporarily stops the installation processing until the 64-bit service pack installer 230 ends the installation processing. When the 64-bit service pack installer 230 ends the installation processing, the 64-bit major version installer 200 resumes the installation processing.

In step S544, along with the activation of the 64-bit installer at this time, the installer execution unit 211 determines whether the installation processing of the application 240 has been performed in step S541. If the installation processing has been performed in step S541 (YES in step 544), the installer execution unit 211 determines that the installation processing of the application 240 has been performed and the processing proceeds to step S546. If the installation processing has not been performed in step S541 (NO in step S544), the installer execution unit 211 determines that the installation processing of the application 240 has not been performed and the processing proceeds to step S545.

In step S545, the installer execution unit 211 displays the installer management screen for restoring or deleting the application 240.

In step S546, the installer execution unit 211 performs transmission control of the end code transmitted from the 64-bit major version installer 210 and the 64-bit service pack installer 230. If the end code is received from the 64-bit service pack installer 230, the installer execution unit 211 takes over the end code of the 64-bit service pack installer 230. If the installation processing is performed by the 64-bit major version installer 210, the installer execution unit 211 generates the end code.

The installer execution unit 211 transmits the end code taken over or generated by itself to the 32-bit major version installer 200. Thus, the end code is transmitted to the invoking installer but the 64-bit major version installer 210 is also the called installer, so that the end code is transmitted to the 32-bit major version installer 200 which is the original caller. Such a configuration of the present invention relates to the log output processing described below.

The installation processing of the 32-bit service pack installer 220 is started by the installer execution unit 221 receiving the processing which indicates the execution of the 32-bit service pack installer 220, from the installer execution unit 201 of the 32-bit major version installer 200.

In step S520, the installer execution unit 211 performs the installation processing of the 32-bit service pack of the application 240. The installer execution unit 211 ends the installation processing of the 32-bit service pack installer 220 after the installation processing of the 32-bit service pack is performed, and transmits the end code of the 32-bit service pack installer 220 to the 32-bit major version installer 200. The execution of this step makes the application 240 the 32-bit service pack application.

The installation processing of the 64-bit service pack installer 230 is started by the installer execution unit 231 receiving the processing which indicates the execution of the 64-bit service pack installer 230, from the installer execution unit 211 of the 64-bit major version installer 210.

In step S560, the installer execution unit 231 performs the installation processing of the 64-bit service pack of the application 240. The installer execution unit 231 ends the installation processing of the 64-bit service pack installer 230 after the installation processing of the 64-bit service pack is performed, and transmits the end code of the 64-bit service pack installer 230 to the 64-bit major version installer 210. The execution of this makes the application 240, the 64-bit service pack application.

The installer which is the original caller for invoking another installer is not necessarily limited to that in FIG. 5. For example, as long as the processing for switching an installer can be performed according to the system environment, another installer other than the installers illustrated in FIG. 5 may also be invoked. An application exclusively used for determining the system environment may also be separately provided to call up each installer. As described above, an automatic installation is performed by the installer best suited to the system environment and an operational burden on the user can be lightened.

FIG. 6 illustrates a flow chart for restoring or deleting the application 240 executed by the 32-bit major version installer 200 or the 64-bit major version installer 210. The flow chart is started by the installer UI units 202 and 212 receiving the processing which displays the installer management screen window 400.

In step S600, the installer UI unit 202 or 212 determines whether the start button 403 or the cancel button 404 is pressed. If the installer UI unit 202 or 212 receives the processing indicating that the start button 403 is pressed, the installer UI unit 202 or 212 determines that the start button 403 has been pressed and the processing proceeds to step S601. If the installer UI unit 202 or 212 receives the processing indicating that the cancel button 404 is pressed, the installer UI unit 202 or 212 determines that the cancel button 404 has been pressed and ends the processing of the flow chart.

In step S601, the installer UI unit 202 or 212 determines whether the restoration-process radio button 401 or the deletion-process radio button 402 is selected. If the restoration-process radio button 401 is selected, the installer UI unit 202 or 212 determines that the application 240 is restored and the processing proceeds to step S602. If the deletion-process radio button 402 is selected, the installer UI unit 202 or 212 determines that the application 240 is deleted and the processing proceeds to step S603.

In step S602, the installer execution unit 201 or 211 restores the application 240. After the application 240 is restored, the processing of the flow chart is ended. In step S603, the installer execution unit 201 or 211 deletes the application 240. After the application 240 is deleted, the processing of the flow chart is ended.

Figure 7:
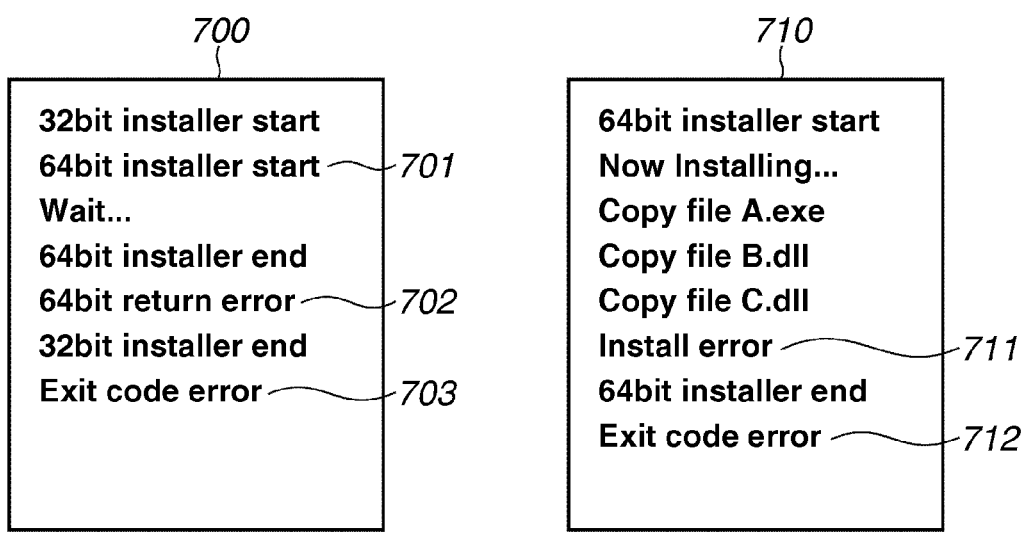
FIG. 7 illustrates examples of log data output by the installers.

FIG. 7 illustrates examples of log data output by the 32-bit major version installer 200 and the 64-bit major version installer 210. The log data in a file format detailing the processing of the installers from the activation to the end are output by the installer UI units 202 and 212. In the present exemplary embodiment, the log data output by the two installers are described. Each installer outputs detailed log data in their respective installation processing.

A 32-bit installer log data 700 stores detailed log of the installation processing of the 32-bit major version installer 200. The 32-bit installer log data 700 also stores log data of installers other than the 32-bit installer log data 700 which are actually activated by invoking.

For example, if the installation processing is performed by the 64-bit service pack installer 230, the 32-bit installer log data 700 stores log data of the 32-bit major version installer 200, the 64-bit major version installer 210, and the 64-bit service pack installer 230. The log data other than the installation processing of the 32-bit major version installer 200 is generated based on the end code transmitted from the invoking installer, so that the log data does not include detailed information about a file (e.g., a component) has been copied, for example. Therefore, the user who views the 32-bit installer log data 700 can totally grasp which installer is activated and performs the installation processing, and what became of the installation processing of the installer. The log data corresponds to first log data.

A 64-bit installer log data 710 stores detailed log of the installation processing of the 64-bit installer. The 64-bit installer log data 710 stores log data only related to the installation processing performed by the 64-bit major version installer 210. Therefore, the log data related to the installation processing by the 64-bit major version installer 210 is stored in detail. The log data 710 includes detailed information indicating a file which is copied, for example. Therefore, the user who views the 64-bit installer log data 710 can clearly grasp a installer installed in the information processing apparatus 100. The log data corresponds to a second log data.

The installer execution unit 201 of the 32-bit major version installer 200 starts outputting the 32-bit installer log data 700 at the same time as the activation of the installer.

Then, an installer switching processing is performed by the installer execution unit 201 to call up another installer (in step S509), activating the 64-bit major version installer 210. The installer execution unit 211 starts outputting the 64-bit installer log data 710. The installer execution unit 211 performs the installation processing, so that detailed information about a file which is copied is output. Since the processing of the 32-bit major version installer 200 is suspended when the installer switching processing is performed, the output of the 32-bit installer log data 700 is also suspended.

When an installation error occurs during the installation processing of the 64-bit major version installer 210 activated by the installer switching processing, a error log 711 is output to end the processing of the 64-bit major version installer 210. At this point, an end code 712 of the 64-bit major version installer 210 is output as log data. The end code 712 indicates an error.

When the processing of the 64-bit major version installer 210 ends, the installation processing of the 32-bit major version installer 200 and the output processing of the log are resumed. The installer execution unit 201 of the 32-bit major version installer 200 receives the end code 712 of the 64-bit major version installer 210 and outputs the installation result of the 64-bit major version installer 210 to the 32-bit installer log data 700 as a log 702. Thus, the end code is merely information indicating how the installation processing has been ended, but not detailed information indicating what installation processing has been performed. The installer execution unit 201 performs the post-processing of installation based on the received end code (in steps S507 and S508).

The following describes the reason the 32-bit major version installer 200 performs the post-processing of installation instead of other installers. As described above, the 32-bit installer log data 700 is a log output for describing the total flow. An installer developer can grasp the outline of the installation processing by viewing the log. Therefore, the installer developer can easily identify a questionable installer.

The log data has to be temporarily aggregated in the 32-bit major version installer 200 to output the log data. However, invoking another installer once more to perform the post-processing of installation results in deterioration of performance. As long as there is the end code, even the 32-bit major version installer which first invokes another installer and aggregates log data regarding the installation processing of each installer to output the log data, can execute the post-processing of installation. Accordingly, the 32-bit major version installer 200 performs the post-processing of installation.

After the post-processing is executed, the processing of the 32-bit major version installer 210 is ended and a log 703 indicating an error end is output.

The reason two different types of log data illustrated in FIG. 7 are output is described below. If a problem with the installation processing arises, the installer developer needs to grasp how the installation processing has been performed based on the log data. The installer developer can easily grasp a installer which fails in the installation processing based on the 32-bit installer log data 700 output by the 32-bit major version installer 200 that has switched the installer.

The installer developer can grasp the fact that the 64-bit major version installer 210, for example, has failed in the installation processing. The installer developer can grasp details of the installation processing, for example, where and what is installed, and what has lead to failure based on the 64-bit installer log data 710 output by the 64-bit major version installer 210 that performs the installation processing of the application.

If the installers output only their respective log data, it takes the installer developer much time to grasp an installer which has caused an error. For this reason, in a case of the invention that a plurality of installers is automatically switched, like the present invention, it is preferable to aggregate log data at one place to easily identify a problematic installer.

However, if all of the log data are output by the 32-bit major version installer 200, the log data is substantially increased, which takes much time for the installer developer to grasp the cause of an error. According to the information processing apparatus, the method for controlling the same, and the program of the present invention, the above problems can be solved. According to the present invention, an optimum post-processing of installation is performed along with an optimum log-output processing of the present invention.

In the first exemplary embodiment, the information processing apparatus is described which performs installation by using the installer suited for the system environment.

Other Embodiment

In the first exemplary embodiment, description is made based on 32- and 64-bit installers but the exemplary embodiment is not limited to the architecture. If at least two or more installers need to be prepared depending on a difference in the configuration of the architecture in data processing of the OS, the present invention is applicable.

In the first exemplary embodiment, the CD/DVD 110 stores four installers, however, the CD/DVD 110 does not always store the four installers. For example, the CD/DVD 110 may store two installers of the 32-bit service pack installer 220 and the 32-bit major version installer 200. Alternatively, the CD/DVD 110 may store two installers of the 64-bit major version installer 210 and the 32-bit major version installer 200. In the case of such a configuration, the processing executed in FIG. 5 is performed only by the stored installers. The present invention can be applied even to the 32- and 64-bit installers in whom the major version installer is integrated with the service pack installer. Furthermore, the present invention can be applied to four or more installers.

In a case where another installer is activated by an installer performing the automatic execution function of the OS provided in the information processing apparatus, in the first exemplary embodiment, installation is performed without inquiring the user about installation using another installer. However, a configuration may be employed in which the user is inquired in performing installation using another installer. For example, if the 32-bit service pack installer 220 is activated by the 32-bit major version installer 200, an inquiry may be made such as "Is it all right to execute installation by the 32-bit service pack installer 220?" If permission is given by the user, installation is performed by the 32-bit service pack installer 220. If not permitted, processing is ended without the installation. The configuration can also be applied to the 64-bit installers.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-084972, filed Apr. 3, 2012, which is hereby incorporated by reference herein in its entirety.

What is claimed is:
1. An information processing apparatus comprising:
   a storage;
   a first installer stored in the storage, wherein the first installer is configured to install an application constituted of software components; and a second installer stored in the storage, wherein the second installer is configured to install a correction module to change a software component of the application, wherein, in a case where the first installer determines that the application is installed, the first installer determines, while refraining from inquiring a user of the information processing apparatus, whether the correction module is installed, wherein, in a case where the first installer determines that the correction module is not installed, the first installer is utilized as an original caller to activate the second installer while refraining from inquiring the user and to temporarily stop performing installation processing, wherein, in response to being activated by the first installer, the second installer installs the correction module and, after the correction module is installed, the first installer resumes performing installation processing, and wherein only the first installer includes a log output function to output log data regarding the installation processing while the second installer includes a log output function other than to output log data regarding the installation processing.

2. The information processing apparatus according to claim 1, wherein the first installer refrains from inquiring the user by not displaying, on a display a management screen for the application.

3. The information processing apparatus according to claim 2, wherein, in a case where the first installer determines that both the application and the correction module are already installed in the information processing apparatus, the first installer displays the management screen on the display to permit the user to restore or delete the application.

4. The information processing apparatus according to claim 1, wherein the first installer determines whether the application is installed by determining whether a code unique to the application exists in registry information of the information processing apparatus, and wherein the first installer determines whether the correction module is installed by comparing a value of a version of the correction module with a value of version information in the registry information.

5. The information processing apparatus according to claim 1, wherein the first installer and the second installer correspond to a first architecture of an operating system, the information processing apparatus further comprising a third installer stored in the storage, wherein the third installer is configured to install the application and corresponds to a second architecture of an operating system that is different from the first architecture, wherein, in a case where the first installer determines that the architecture of an operating of the information processing apparatus is the second architecture, the first installer is utilized as an original caller to activate the third installer while refraining from inquiring the user and to temporarily stop performing installation processing, and wherein, in response to being activated by the first installer, the third installer installs the application in the information processing apparatus and the first installer subsequently resumes performing installation processing after the application is installed by the third installer.

6. The information processing apparatus according to claim 5, further comprising a fourth installer stored in the storage, wherein the fourth installer is configured to install the correction module to change a software component of the application and corresponds to the second architecture, wherein, in response to the first installer activating the third installer and in a case where the third installer determines that the correction module is not installed, the third installer is utilized as an original caller to activate the fourth installer while refraining from inquiring the user and to temporarily stop performing installation processing, and wherein, in response to being activated by the third installer, the fourth installer installs the correction module and, after the correction module is installed, the third installer resumes performing installation processing and then the first installer resumes performing installation processing.

7. The information processing apparatus according to claim 6, wherein the first architecture is a 32-bit environment and the second architecture is a 64-bit environment.

8. The information processing apparatus according to claim 1, wherein, in a case where the first installer determines that an end code of the installation processing by the second installer indicates an error, the first installer performs post-processing of installation as an invoking installer.

9. A control method for an information processing apparatus having a storage storing a first installer and a second installer, wherein the first installer is configured to install an application constituted of software components and the second installer is configured to install a correction module to change a software component of the application, the control method comprising:

determining, via the first installer and while refraining from inquiring a user of the information processing apparatus, whether the correction module is installed in a case where the first installer determined that the application is installed;

utilizing, in a case where the first installer determines that the correction module is not installed, the first installer as an original caller to activate the second installer while refraining from inquiring the user and to temporarily stop performing installation processing;

installing, via the second installer in response to the second installer being activated by the first installer, the correction module; and resuming performing installation processing by the first installer after the correction module is installed via the second installer, wherein only the first installer includes a log output function to output log data regarding the installation processing while the second installer includes a log output function other than to output log data regarding the installation processing.

10. A non-transitory computer-readable storage medium storing a program to cause an information processing apparatus to perform a control method, wherein the program includes a first installer and a second installer, wherein the first installer is configured to install an application constituted of software components and the second installer is configured to install a correction module to change a software component of the application, the control method comprising:

determining, via the first installer and while refraining from inquiring a user of the information processing apparatus, whether the correction module is installed in a case where the first installer determined that the application is installed;

utilizing, in a case where the first installer determines that the correction module is not installed, the first installer as an original caller to activate the second installer while refraining from inquiring the user and to temporarily stop performing installation processing;

installing, via the second installer in response to the second installer being activated by the first installer, the correction module; and resuming performing installation processing by the first installer after the correction module is installed via the second installer, wherein only the first installer includes a log output function to output log data regarding the installation processing while the second installer includes a log output function other than to output log data regarding the installation processing.

11. The information processing apparatus according to claim 5, wherein, in addition to activating the third installer, the first installer refrains from activating at least one of (i) an installer associated with the first architecture and (ii) an installer that is associated with the second architecture and capable of running a first architecture application.

12. The information processing apparatus according to claim 11, wherein the first architecture is a 32-bit environment and the second architecture is a 64-bit environment.

13. The information processing apparatus according to claim 1, wherein the first installer is configured to inquiry the user by displaying, on a display a management screen for the application.

14. The information processing apparatus according to claim 1, wherein the first installer determines whether the correction module is installed by installing a correction module to determine whether a change occurs in a version of the installed application.

15. The information processing apparatus according to claim 1, wherein the storage is a compact disk (CD) configured to be removeably inserted into the information processing apparatus.

16. The information processing apparatus according to claim 1, wherein, in a case where the first installer determines that the application is not installed in the information processing apparatus, the first installer installs the application in the information processing apparatus.

* * * * *